Nov. 7, 1939.   J. C. SCHELLIN   2,178,897
SIGNAL LAMP
Filed Jan. 30, 1937   2 Sheets-Sheet 1
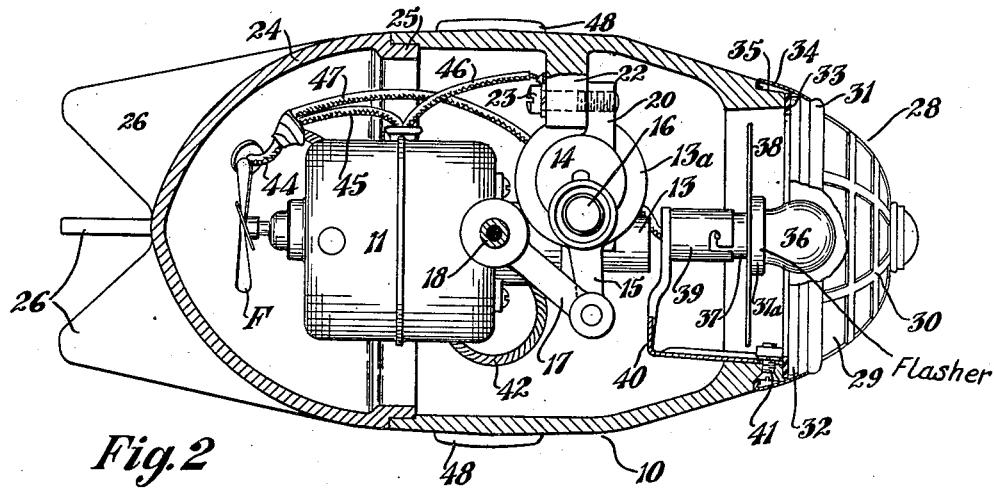
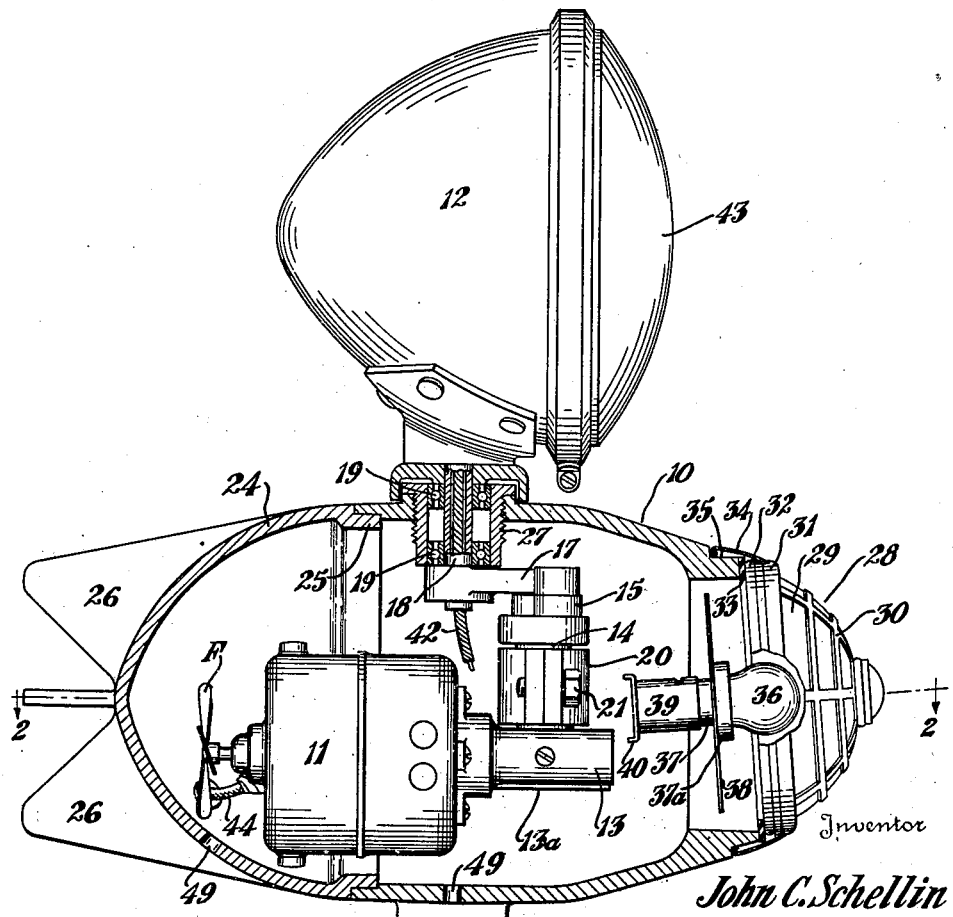

Nov. 7, 1939.     J. C. SCHELLIN     2,178,897
SIGNAL LAMP
Filed Jan. 30, 1937     2 Sheets-Sheet 2

Inventor
John C. Schellin

Patented Nov. 7, 1939

2,178,897

UNITED STATES PATENT OFFICE 2,178,897

SIGNAL LAMP

John C. Schellin, Wooster, Ohio

Application January 30, 1937, Serial No. 123,259

3 Claims. (Cl. 177—329)

The invention relates to signal or warning lamps, and more particularly to a warning lamp structure for emergency vehicles such as fire department apparatus, police emergency cars and ambulances.

Certain prior warning signals for emergency vehicles have included oscillating lamps, but where the warning lamp oscillates from side to side, it is difficult for pedestrians and motorists to ascertain the position and from what direction the emergency vehicle is approaching. Other prior warning signals have included a warning lamp which oscillates in a vertical plane, but in this case, the light does not sufficiently illuminate the sides of the roadway so as to warn persons not in the direct path of the light.

Accordingly, it is a general object of the present invention to provide a warning lamp signal for emergency vehicles which produces a novel lighting effect, which will compel the attention of all persons on or at the sides of a roadway for great distances in advance of the vehicle.

Another object is to provide a warning lamp signal for emergency vehicles, which clearly indicates the position of the vehicle to persons in advance thereof and the direction from which the vehicle is aproaching.

A further object is to provide a warning lamp signal projecting a light which sweeps the roadway from side to side over a wide span in advance of the vehicle.

A still further object is to provide a warning lamp structure which is simple and compact in construction, and which produces such a novel and peculiar lighting effect as to instantly identify an emergency vehicle.

These and other objects are accomplished by the improvements comprising the present invention, which is hereinafter described in detail and shown in the accompanying drawings, and which is defined in the appended claims.

In general terms, the invention may be stated as including a motor housing having a flasher lamp mounted in one end for projecting light rays straight ahead, and a laterally oscillatable lamp mounted on said housing immediately above said flasher lamp.

Referring to the drawings forming part hereof,

Figure 1 is a side view partly in section and partly in elevation of the improved warning lamp signal;

Fig. 2 is a plan sectional view as on line 2—2, Fig. 1;

Similar numerals refer to similar parts throughout the several views of the drawings.

Figure 3:
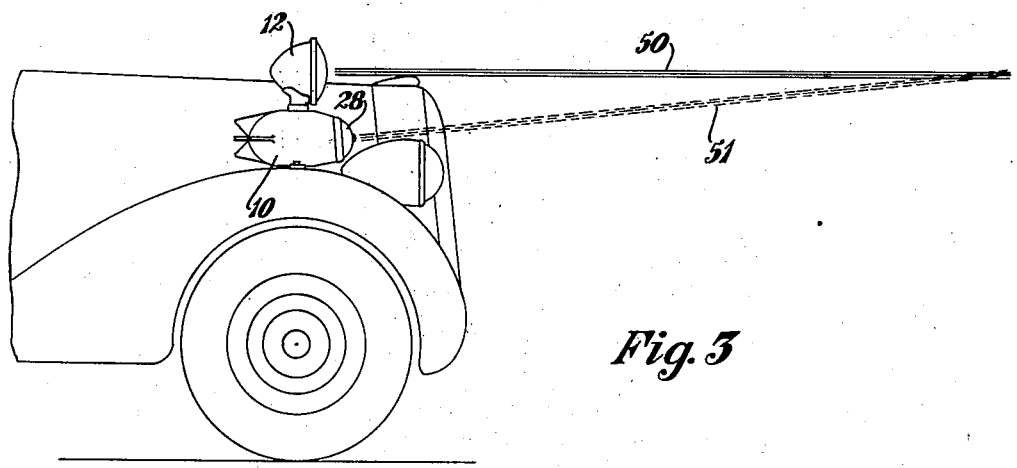
Fig. 3 is a general view showing the improved lamp signal mounted in position upon the front fender of an emergency vehicle and indicating the light rays from both lamps.

The improved lamp structure includes a preferably tubular housing indicated generally at 10, for enclosing the motor 11 and the mechanism for driving the oscillating or swinging lamp 12 mounted on and above the housing 10.

The motor 11 is of a usual construction for being operated from an automobile storage battery, which may be either a six volt or a twelve volt system or any other voltage requirement. The motor shaft drives a worm in worm housing 13, and the worm in turn drives a worm gear enclosed in a housing 13a in a usual manner.

A crankshaft 14 is secured in the worm gear and is driven thereby, and the shaft 14 has a connecting rod 15 eccentrically connected thereto as by the pivot 16. The connecting rod 15 is pivotally connected at its other end to a link 17 and the link 17 is secured at its other end to the tubular mounting post 18 of the oscillating lamp 12. The mounting post 18 is disposed in a vertical position perpendicular to the longitudinal axis of the housing 10, so that the lamp 12 oscillates in a horizontal plane if the housing is in a horizontal position. The weight of the lamp 12 is carried by suitable bearings indicated at 19 in which the mounting post 18 is journaled, the bearings being mounted in a bushing 27 screwed in the housing.

When the motor is operated, the connecting rod 15 and the link 17 will oscillate the lamp 12 rapidly from side to side approximately 110 times a minute through an arc of approximately 40°, although the amount of oscillation and the number of oscillations per minute may obviously be varied if desired by changing the motor speed or altering the oscillating mechanism.

Preferably, the motor 11 and the oscillating mechanism are mounted in the housing 10 by means of a split bracket 20 encircling the crankshaft 14. The free ends of the bracket are clamped around the crankshaft by means of a screw or the like, 21, and the other end of the bracket is secured by a screw 23 to a lug 22 on the housing.

A rear end closure 24 is provided for the housing 10, and may have a reduced annular flange 25 for fitting inside the housing so as to make a tight joint. The closure 24 may be provided with vanes 26 if desired for enhancing the appearance of the housing.

The front end of the housing 10 is tubular and has mounted therein the flasher lamp indicated generally at 28, including a preferably red lens 29 which may be protected by a metal guard member 30. The guard member 30 has a base ring 31 for abutting a shoulder on the lens formed by a bead 32, and the bead 32 abuts a rubber gasket 33 which in turn abuts the open end of the housing 10.

A clamping ring 34 is secured in an annular external groove 35 formed on the end of the housing, and is adapted to engage over the base ring 31 of the guard member for clamping the guard member and lens on the end of the housing. Preferably, the end of the housing and the external groove 35 thereon are formed so as to tilt or incline the lens upwardly at a slight angle relative to the axis of the housing, for a purpose to be described.

The flasher bulb 36 with its base 37, collar portion 37*a* and reflector 38, are of well known construction and manufactured as a unit. The internal construction of the collar portion 37*a* and the base 37 is such as to cause the bulb 36 to flash on and off or "wink" rapidly about 150 times per minute, when the bulb is connected in a six or twelve volt electric circuit. Since the lamp 12 oscillates about 110 times per minute, the lamp 28 flashes more than once for each oscillation.

The socket 39 for receiving the base 37 is mounted on the housing preferably by means of a bracket arm 40 secured at the end to the housing by a bolt 41, as shown in Fig. 2, and the socket 39 is tilted or inclined upwardly at a slight angle as indicated in Fig. 1, so as to mount the flasher bulb and reflector in axial alignment with the lens 29.

The oscillating lamp 12 is of well known construction and has the usual bulb and reflector, electric current being supplied to the bulb by means of an electric conductor 42 passing through the tubular mounting post 18. The lens 43 of the lamp 12 is preferably of red glass to adapt the lamp for use as a warning signal.

The electric conductor for supplying current to the lamp structure from a source of current, such as a storage battery, is shown at 44 and preferably enters the housing 10 through a rubber annular gasket secured in and extending through the wall of the rear closure 24. The conductor 44 supplies current to the motor 11 through conductor 45, and the motor is grounded on the housing by means of conductor 46. Current is supplied to the socket 39 for the flasher bulb 36 through conductor 47.

The housing 10 is provided with suitable supporting lugs indicated at 48 for mounting the lamp structure on an emergency vehicle, as indicated in Fig. 3, where the lamp is shown mounted on the front fender of an automotive vehicle.

The rear end of the motor shaft may have mounted thereon a small fan F for air cooling the motor 11, small apertures 49 being provided in the bottom of the housing 10 and rear closure 24 for permitting ingress and egress of air.

Figure 4:
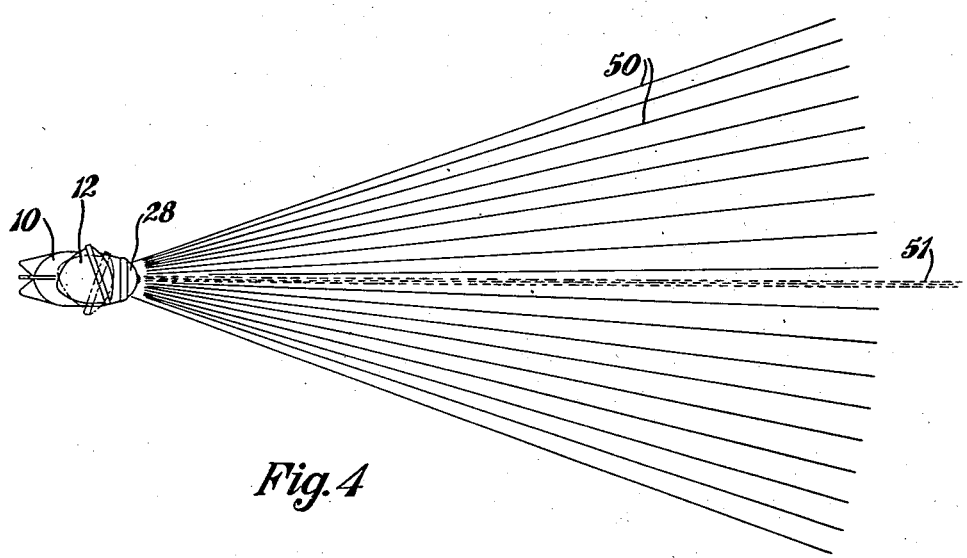
Fig. 4 is a diagrammatic plan view of the lamp signal indicating the span covered by the rays from the oscillating lamp and the direction of the rays from the flasher lamp.

When the novel signal lamp is operated on an emergency vehicle such as a fire apparatus, it serves to clear traffic from the roadway in advance of the vehicle because the oscillating lamp 12 projects light rays 50 forwardly which sweep the roadway over a wide span as indicated diagrammatically in Fig. 4, so as to attract the attention of and warn all persons on or at the sides of the roadway. At the same time the flasher lamp 28 projects light rays 51 in a vertical plane from directly under the oscillating lamp so as to enable anyone in advance of the vehicle to ascertain accurately the position of the vehicle and the direction from which it is approaching.

By mounting the oscillating lamp directly above and in vertical alignment with the flasher lamp, a peculiar and novel lighting effect is obtained, which enables anyone to identify the approach of an emergency vehicle.

By tilting the flasher lamp upwardly at a slight angle, as previously described, the flasher rays 51 are made to intersect the oscillating rays 50 at a point in advance of a vehicle, thereby enhancing the peculiar and novel effect produced by the present improved signal lamp.

Figure 5:
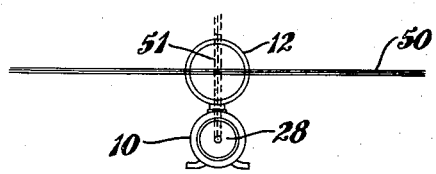
Fig. 5 is a diagrammatic elevation of the improved lamp indicating the lighting effect produced upon an observer in advance of the lamp, resulting from the intersection of the rays from the flasher and oscillating lamp.

When viewed from the front of the lamp, the rays 50 and 51 produce a "cross" effect, as indicated diagrammatically in Fig. 5, since the flasher light flashes at least once for each oscillation of the oscillating lamp 12.

It will be understood that obvious modifications may be made in the construction and arrangement of the various parts of the improved lamp structure without departing from the spirit of the invention as defined in the appended claims.

I claim:

1. A signal lamp structure including a housing, a lamp fixedly mounted in one end of said housing in a slightly upwardly inclined position relative thereto, a laterally oscillatable lamp mounted on and above the housing on a vertical axis perpendicular thereto, means in the housing for oscillating the oscillatable lamp, and means for flashing the fixed lamp at least once for every oscillation of the oscillatable lamp.

2. A signal light including a fixed lamp for directing a beam of light forwardly and inclining upwardly, means for flashing said lamp off and one, an oscillatable lamp mounted on a vertical axis on and immediately above said fixed lamp for directing light rays forwardly in a horizontal plane, and means for continuously oscillating said oscillatable lamp in opposite directions.

3. A signal light including a fixed lamp for directing a beam of light forwardly, means for flashing said lamp off and on, an oscillatable lamp mounted on and above said fixed lamp at an inclination thereto, and means for continuously oscillating said oscillatable lamp in opposite directions, said lamps being so constructed and arranged that the beam from the fixed lamp intersects the path of light from the oscillatable lamp.

JOHN C. SCHELLIN.